United States Patent
Ustach

[11] 3,725,686
[45] Apr. 3, 1973

[54] POLYPHASOR GENERATION BY VECTOR ADDITION AND SCALAR MULTIPLICATION

[75] Inventor: Gerald S. Ustach, Los Angeles, Calif.

[73] Assignee: Hughes Aircraft Company, Culver City, Calif.

[22] Filed: Jan. 29, 1971

[21] Appl. No.: 110,956

[52] U.S. Cl. .................... 235/156, 235/186, 321/52, 328/133
[51] Int. Cl. ........................... G06f 7/38, G06g 7/22
[58] Field of Search .............. 235/156, 152, 186, 197; 321/52; 328/133

[56] References Cited

UNITED STATES PATENTS

| | | |
|---|---|---|
| 3,631,233 | 12/1971 | McKenna ........................... 235/186 |
| 3,517,173 | 6/1970 | Gilmartin, Jr. et al. ............. 235/156 |
| 3,573,446 | 4/1971 | Bergland ........................... 235/156 |

*Primary Examiner*—Malcolm A. Morrison
*Assistant Examiner*—David H. Malzahn
*Attorney*—W. H. MacAllister, Jr. and Lawrence V. Link, Jr.

[57] ABSTRACT

Herein is disclosed the method and apparatus for producing angular rotations of an input signal (phasor). The method involves phase shifting the input signal by a preselected amount, vectorially adding the input and the phase shifted signals, and then adjusting the amplitude of the sum phasor by a scalar multiplication operation. The addition and multiplication steps are repeated in a plurality of subsequent processing operations whereby various combinations of phasor signals produced during preceding steps are summed and amplitude adjusted to obtain a set of output signals having preselected phase values.

13 Claims, 7 Drawing Figures

POLYPHASOR GENERATION BY VECTOR ADDITION AND SCALAR MULTIPLICATION

BACKGROUND OF THE INVENTION

This invention relates generally to the method and apparatus for providing phase rotations of an applied signal; and particularly to such a method and apparatus adaptable to digital signal processing applications.

In certain signal processing applications such as digital filtering and correlation, a large number of phase adjustments are required. For example, in the fast Fourier Transform Method of spectrum analysis, each phasor taken from storage is phase rotated before the accumulation step. As used herein, the term phasor is a signal or a combination of signals indicative of amplitude and relative phase. Prior to the subject invention, in digital processors phasor rotations were generally mechanized by multiplying the applied signal by unity phasors of the desired phase angles. In sophisticated digital processors such as those used in radar systems, for example, the prior art phase rotation methods require large amounts of selection and storage circuitry to acquire the correct rotation coefficient, as well as complex multiplier circuits to accomplish the rotation. In the rectangular form of signal processing (inphase and quadrature signals) widely used to implement digital filters and correlation systems, complex multiplication requires four scalar multiplications, a subtraction and an addition.

SUMMARY OF THE INVENTION

It is therefore an object of the subject invention to provide an improved method and apparatus for generating angular rotations of an input phasor.

Another object is to provide a digital polyphasor generator of reduced complexity which has the capability of higher operational speeds than corresponding prior art devices.

A further object is to provide a method of rotating an applied phasor through any desired phase angle by means of a series of additions and multiplications, such that for any given phase angle the addition and multiplication coefficients are fixed allowing simplifications in associated timing and arithmetic circuitry.

Still another object is to provide a polyphase generator of reduced equipment complexity which is especially adapted to provide discrete angular phase rotations related by binary fractions, such as required by certain digital processing techniques.

Briefly, the subject invention includes the apparatus for and the method of adjusting the phase angle of an applied phasor by a series of additions and scalar multiplications. The applied signal $me^{j\phi}$ is first phase shifted through a selected convenient initial angle $\theta$ to form the signal $me^{j(\phi + \theta)}$. The latter two signals are vectorially summed to form the signal $1/k\, me^{j(\phi + \theta/2)}$ and this signal is multiplied by the scalar $k$ to produce a signal which is equal to the applied signal in magnitude and which is rotated by half the angle $\theta$. This just described procedure is repeated in subsequent processing steps which utilize selected combinations of the signals from preceding processing operations, so as to produce any desired set of phase rotated output signals which are equal in amplitude to the applied signal and phase shifted by desired amounts.

BRIEF DESCRIPTION OF THE DRAWINGS

The novel features of this invention, as well as the invention itself, will be better understood from the accompanying description taken in connection with the accompanying drawings in which like reference characters refer to like parts and in which.

DESCRIPTION OF THE PREFERRED EMBODIMENTS

Figure 1:
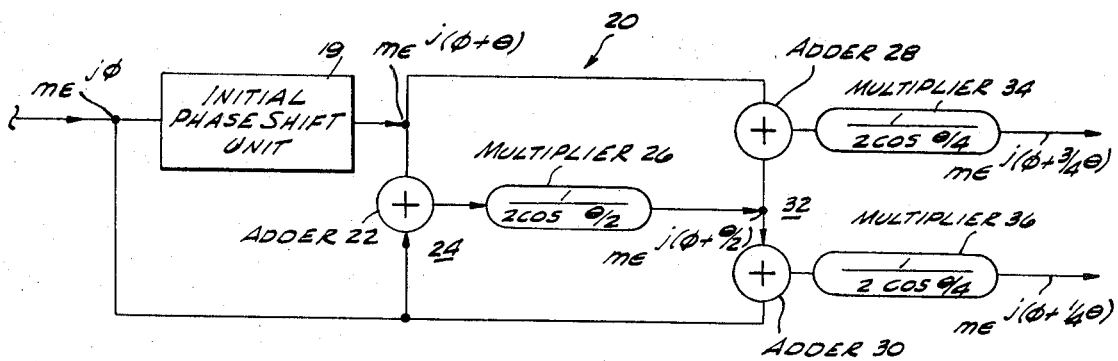
FIG. 1 is a block diagram of one preferred embodiment a polyphasor generator in accordance with the subject invention.

Reference is first directed primarily to FIG. 1 which shows a two-stage polyphasor generator 20 in accordance with the principles of the subject invention. A digital input signal $me^{j\phi}$ is first phase rotated by an initial phase angle $\theta$ in a phase shift unit 19 to produce the signal $me^{j(\phi + \theta)}$; and these two just referenced signals are applied as inputs to a digital adder 22 of a first stage 24. One unit suitable for phase shifter 19 will be described hereinafter relative to FIG. 4; and adder 22 may be any suitable conventional dual channel digital adder.

Each phasor such as $me^{j\phi}$, is processed as a pair of inphase and quadrature signals ($m \cos \phi$ and $m \sin \phi$, respectively); and each of these signal component is processed in functionally independent parallel channels. In the interest of clarity of the drawings, only a single lead and digital equipment channel are shown for each phasor signal path. It is understood, however, that the required number of leads for each bit of each inphase and quadrature signal are utilized; and all processing equipment such as digital adder 22 comprises two separate parallel channels, one for the inphase and one for the quadrature signal. This type of parallel inphase and quadrature signal processing, as well as the graphic illustration thereof by means of a single processing path for each phasor is well understood in the digital signal processing art.

The magnitude of the output signal from adder 22 is adjusted in a scalar multiplier 26, also part of the first processing stage 24, to provide an output signal therefrom equal to $me^{j(\phi + \theta/2)}$. Again it is noted that the multiplier 26, as well as all other units shown in the figures, contains two functionally separate parallel processing channels, one for the inphase and one for the quadrature components of each phasor.

The output signal of multiplier 26 (inphase and quadrature components) is applied in parallel to adders 28 and 30 of a second processing stage 32. The other input signal to adder 28 is the initial phase shifted signal $me^{j(\phi+\theta)}$ and the amplitude of the output signal of adder 28 is adjusted in a multiplier 34 to provide an output signal $me^{j(\phi+3/4\theta)}$. The other input signal to adder 30 is the applied input signal $me^{j\phi}$ and the amplitude of the output signal therefrom is adjusted in a multiplier 36 to produce the signal $me^{j(\phi+\theta/4)}$.

Figure 2:
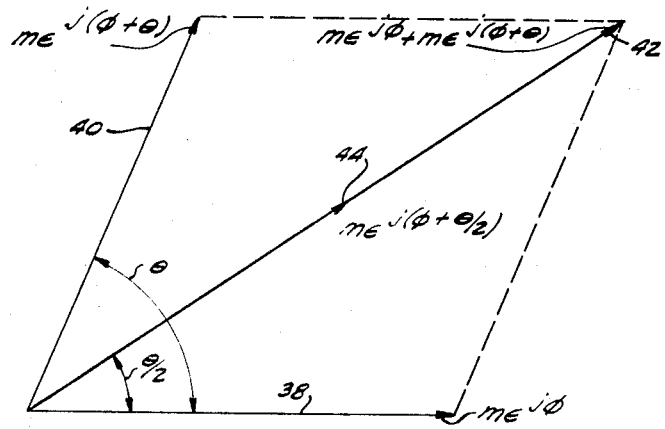
FIG. 2 is a vector diagram useful for explaining the operation of the subject invention.

The operation of the polyphasor generators in accordance with the subject invention may be better understood by reference to FIG. 2 wherein the applied signal $me^{j\phi}$ is illustrated by a vector 38, and the initial phase shifted phasor $me^{j(\phi+\theta)}$ by a vector 40. The output signal of adder 22 (FIG. 1) is depicted by vector 42 which bisects the angle $\theta$. Hence rotation of the original phasor by an angle $\theta/2$ is accomplished in adder 22, along with a change in magnitude. Adjusting the magnitude of vector 42 to that of the originally applied signal $me^{j\phi}$ is simply a scalar multiplication (both the inphase and quadrature components) by a factor of $k$ (see vector 44 of FIG. 2). The value of $k$ is a function of the initial preselected phase angle $\theta$. For example, setting $$me^{j(\phi+\theta/2)} = k \cdot (me^{j\phi} + me^{j(\phi+\theta)})$$

$$= k \cdot [a+jb+(a+jb)\cdot(\cos\theta+j\sin\theta)]$$

yields $k = 1/(2\cos\theta/2)$; where $a = m\cos\phi$ and $b = m\sin\phi$. Thus the phasor $me^{j(\phi+\theta/2)}$ can be simply generated by scalar multiplication of the sum of two phasors. The amplitude adjustment is performed by scalar multiplier units such as multiplier 26 of FIG. 1, for example.

As shown in FIG. 1, the just described process is repeated in the second stage 32 wherein the phasors $me^{j\phi}$ and $me^{j(\phi+\theta/2)}$ are used to obtain the output phasor $me^{j(\phi+\theta/4)}$; and phasors $me^{j(\phi+\theta/2)}$ and $me^{j(\phi+\theta)}$ are utilized to provide the output signal $me^{j(\phi+3/4\theta)}$.

As mentioned above, heretofore phase rotation was generally accomplished in data processing systems by multiplying the applied phasor $me^{j\phi}$, by a unity phasor of the desired rotation angle $\alpha$. Hence, in complex polar form $$me^{j\phi} \cdot e^{j\alpha} = me^{j(\phi+\alpha)}$$

and in complex rectangular form $$me^{j\phi} \cdot e^{j\alpha} = (a+jb)\cdot(\cos\alpha+j\sin\alpha)$$

$$= a\cos\alpha - b\sin\alpha + j(a\sin\alpha+b\cos\alpha)$$

where $a = m\cos\phi$ and $b = m\sin\phi$. Phasor rotation in polar form requires only a single addition while in rectangular form it requires four multiplications, a subtraction, and an addition. Since most digital processors utilize rectangular (inphase and quadrature) coordinates, in accordance with the generally utilized prior art technique, a large amount of digital circuitry is required to implement numerous phasor rotations.

Additionally, certain signal processing techniques such as digital filtering requires only discrete angular rotations which are related by binary fractions such as ½, ¼, ⅛, ¾, ⅜ ... etc., corresponding to rotation angles of 180°, 90°, 45°, 270°, 135° ... etc. respectively, for example. The subject invention is particularly suited to the production of a large number of binary related phasor rotations and it greatly reduces the amount of digital circuitry required in such cases.

Figure 3:
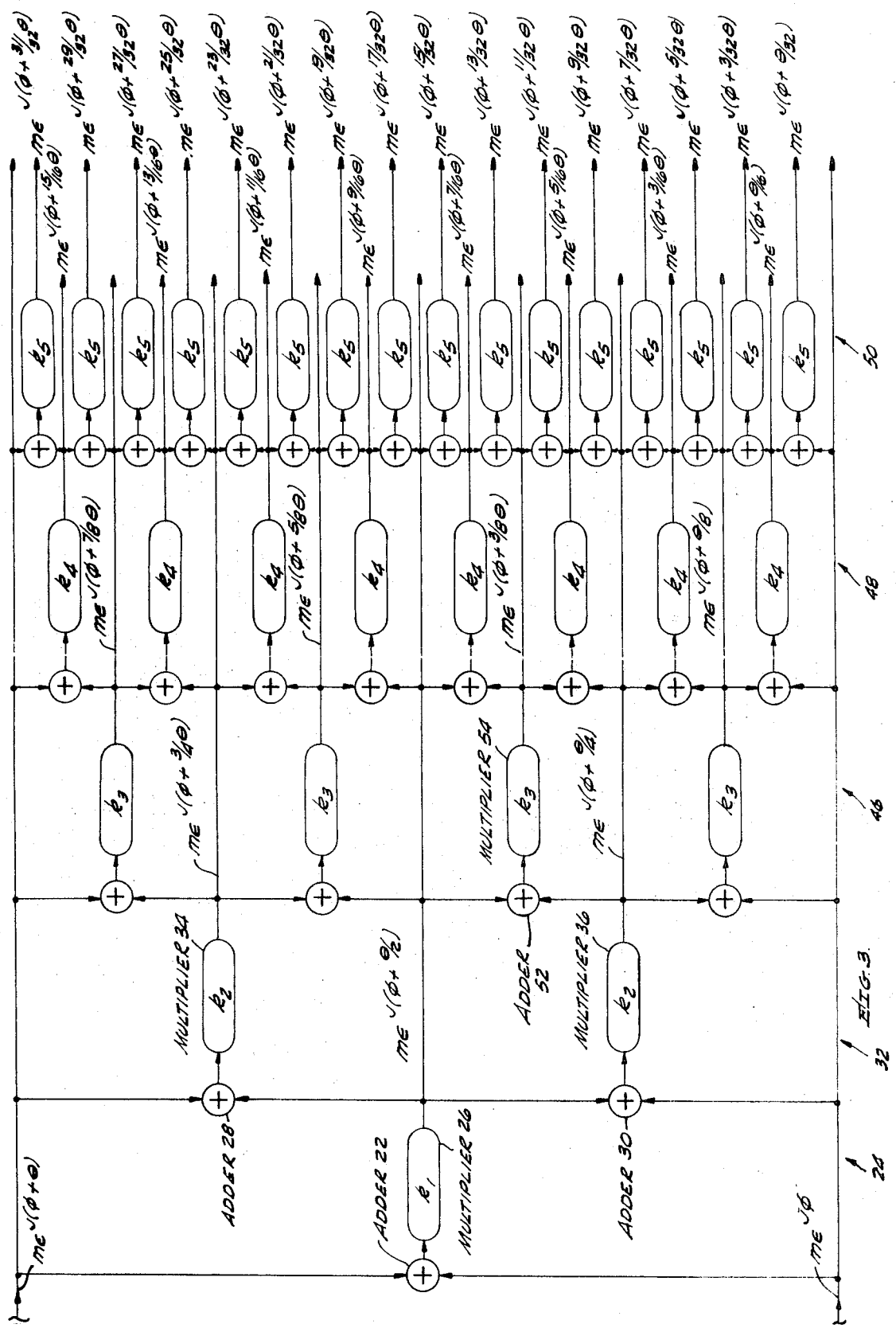
FIG. 3 is a block diagram of a five-stage polyphasor generator in accordance with the subject invention.

FIG. 3 shows a five-stage polyphasor generator wherein the additional stages are mechanized by a systematic extension of the above-described techniques with stages 46, 48 and 50 providing output signals phase rotated halfway between the phasors produced by preceding stages. For example, adder 52 and multiplier 54 of stage 46 provide the output signal $me^{j(\phi+3/8\theta)}$ which is at a phase angle halfway between the phasor $me^{j(\phi+\theta/4)}$ from multiplier 36 of stage 32, and phasor $me^{j(\phi+\theta/2)}$ from multiplier 26 of stage 24. Similarly, the fourth stage 48 provide output signals at the various multiples of one-sixteenth $\theta$; and signals from the fifth stage 50 are at various multiples of one thirty-second $\theta$.

In FIG. 3 the value of the multiplication constants for each of the five stages of the polyphasor generator are designated by the letter $k$ with a subscript corresponding to the number of the stage containing the particular multiplier. The value of each multiplication constant may be determined from the equation $k_n = 1/(2\cos\theta/2^n)$; where $n$ is the order of the particular stage. Hence the value of $k_1$ is $1/(2\cos\theta/2)$; value of $k_2$ is $1/(2\cos\theta/4)$; the value of $k_3$ is $1/(2\cos\theta/8)$ and etc.

The complexity of the $k$ multiplier constants is determined by the number of "1's" in the binary representation thereof. A series of $k$'s based upon an initial phase shift angle $\theta$ of 90° is shown in Table I.

TABLE I

| Stage No. $n$ | Values of $k$ for $\theta$ of 90° | | |
|---|---|---|---|
| | Angle Between Input Phasors | $k_n$ (Decimal) | $k_n$ (Binary) |
| 1 | 90° | 0.70711 | 0.1011010100001 |
| 2 | 45° | 0.54120 | 0.1000101010010 |
| 3 | 22.5° | 0.50980 | 0.1000001010000 |
| 4 | 11.25° | 0.50242 | 0.1000000010100 |
| 5 | 5.675° | 0.50060 | 0.1000000000101 |

As the angle between the input phasors to each stage of the polyphasor generators decreases, the value of $k$ approaches 0.5. This is quite important inasmuch as a binary multiplication by 0.5 is simply a shift of the binary point and thus may be mechanized by the arrangement of interconnecting leads between units. The point at which $k$ may be approximated by 0.5 depends upon the initial phase angle $\theta$, and on the number of binary bits of accuracy required. In the mechanization associated with Table I, $k$ may be approximated by 0.5 for angles of 11.25° or smaller if only 8 bit accuracy is required. The value of the multiplication constants for a five-stage polyphasor generator having an initial phase angle of 120° are tabulated in Table II.

TABLE II

| Stage No. $n$ | Values of $k$ for $\theta$ of 120° | | |
|---|---|---|---|
| | Angle Between Input Phasors | $k_n$ (Decimal) | $K_n$ (Binary) |
| 1 | 120° | 1.00000 | 1.0000000000000 |
| 2 | 60° | 0.57735 | 0.1001001110011 |
| 3 | 30° | 0.51764 | 0.1000010010001 |
| 4 | 15° | 0.50432 | 0.1000000001001 |
| 5 | 7.5° | 0.50107 | 0.1000000001001 |

As is evident from Table II the initial starting angle of 120° allows $k_1$ (the multiplication constant of the first stage) to be simply 1.0. Hence no circuitry is required to adjust the amplitude of the output signal from adder 22. A comparison of the "$ks$" for the 90° initial phase shift case (Table I) and the 120° application (Table II) indicates that the latter requires less digital hardware to implement. However, this advantage is somewhat offset by the additional complexity of generating the initial phasor $me^{j(\phi + 120°)}$, since $me^{j(\phi + 120°)} = (a+jb)(\cos 120° + j \sin 120°)$; while $me^{j(\phi + 90°)} = -b+ja$. The term $-b+ja$ may be implemented by simply reversing the inphase and quadrature terms of the applied signal with a sign reversal of the applied quadrature term (the inphase output term).

Figure 4:
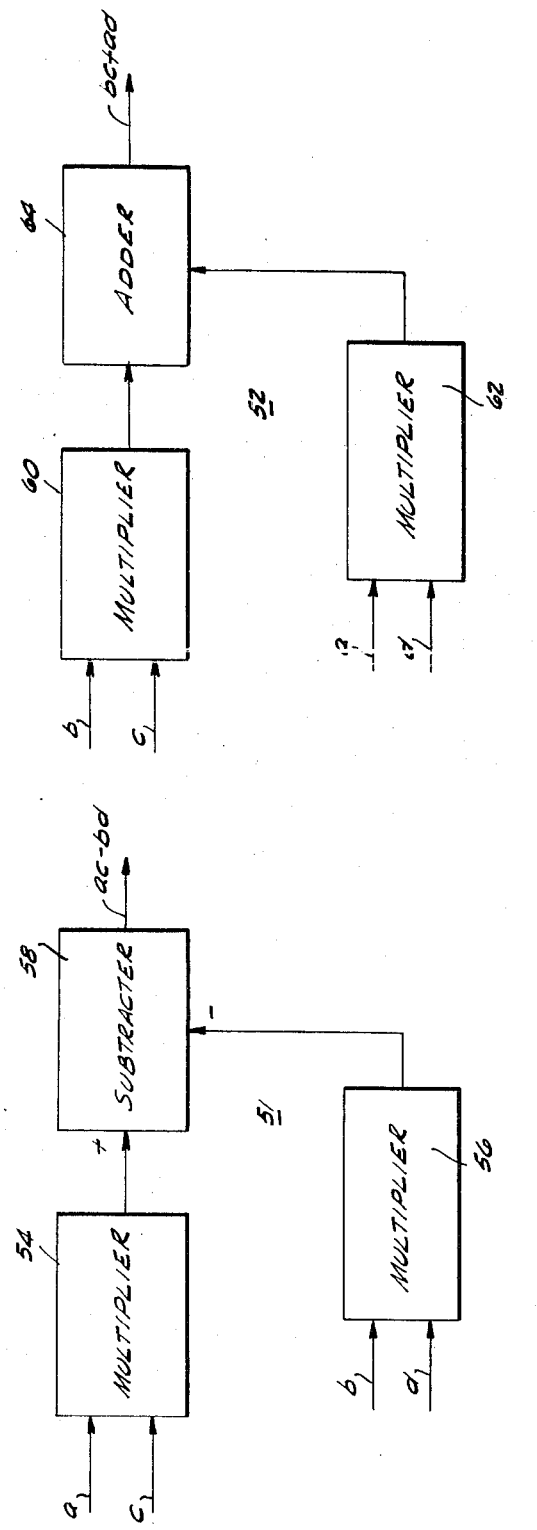
FIG. 4 is a block diagram of a complex multiplier unit which may be used to apply an initial phase shifted signal to the phasor rotation generators of the subject invention.

A circuit suitable for generating the general case initial phase angle by complex multiplication is shown in FIG. 4. For example, the initial phase angle $me^{j(\phi + \theta)}$ may be mechanized by multiplying the applied signal $me^{j\phi}$ by the unity phasor $\epsilon^{j\theta}$. In rectangular coordinate notation the phasor $me^{j\phi}$ may be expressed as $a + jb$ and the unity phasor $\epsilon^{j\phi}$ as $c + jd$. The product of the latter two phasors in rectangular notation is $(ac - bd) + j(bc + ad)$ where $a = m \cos \phi$; $b = m \sin \phi$; $c = \cos \theta$; and $d = \sin \theta$. The term $(ac - bd)$ is the inphase component and $(bc + ad)$ is the quadrature component of the product. As shown in FIG. 4, the inphase component is mechanized in section 51 of the complex multiplier unit and the quadrature component is mechanized in section 52.

Section 51 includes multiplier units 54 and 56, which may be conventional digital multipliers, wherein the terms ac and bd are formed, respectively. The latter term is subtracted from the former in a subtracter unit 58 to form the inphase term of the complex product. Similarly, as shown in section 52 of FIG. 4, multiplier units 60 and 62 form the terms bc and ad, respectively, and these terms are combined in an adder 64 to form the quadrature term of the complex product.

Figure 5:
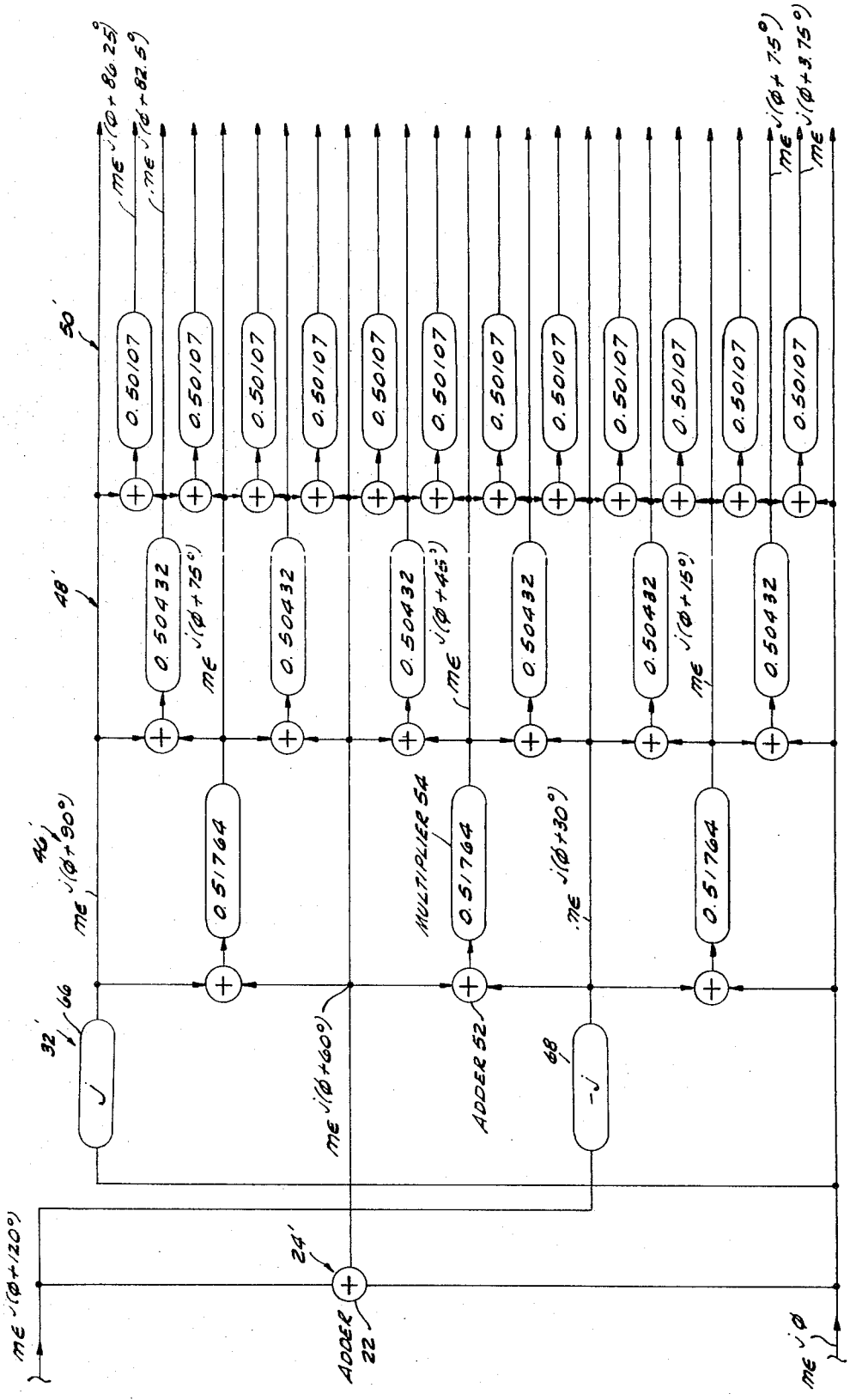
FIG. 5 is a block diagram of a polyphasor generator having an initial phase angle of 120° and a modified configuration for reduction in equipment complexity.

In accordance with the subject invention, the initial phase angle and detailed configuration of the polyphase generators may be selected to improve the "$k$ series" and reduce equipment complexity for each particular application. For example, FIG. 5 shows a five-stage polyphase generator having an initial angle of 120°, wherein the adders in the second stage 32', such as 28, and 30 of FIG. 3, are eliminated by rotating the applied signal $me^{j\phi}$ by 90° to obtain $me^{j(\phi + 90°)}$; and by rotating the initial phase shifted signal $me^{j(\phi + 120°)}$ by a minus 90° to obtain $me^{j(\phi + 30°)}$. In effect equipment simplicity is obtained by applying a plurality of selected phase shifted signals to stage 46'. Further, in FIG. 5 additional equipment simplification is obtained by eliminating redundant phase rotations greater than 90°.

In the second stage 32' of the polyphase generator shown in FIG. 5, the positive 90° phase rotation is implemented in a unit 66 and the negative 90° phase rotation in a unit 68. Unit 66 may consist merely of interconnections such that the inphase and quadrature signals applied thereto are interchanged at the output terminals, with a sign reversal of the inphase output term, since $me^{j(\phi + 90°)} = -b+ja$. Similarly unit 68 may comprise interconnections for reversing the inphase and quadrature signals at the output terminals thereof with a sign reversal of the output quadrature signal. For example, if the input signal to unit 68 is $c + jd$, then the output signal would be $d - jc$.

Figure 6:
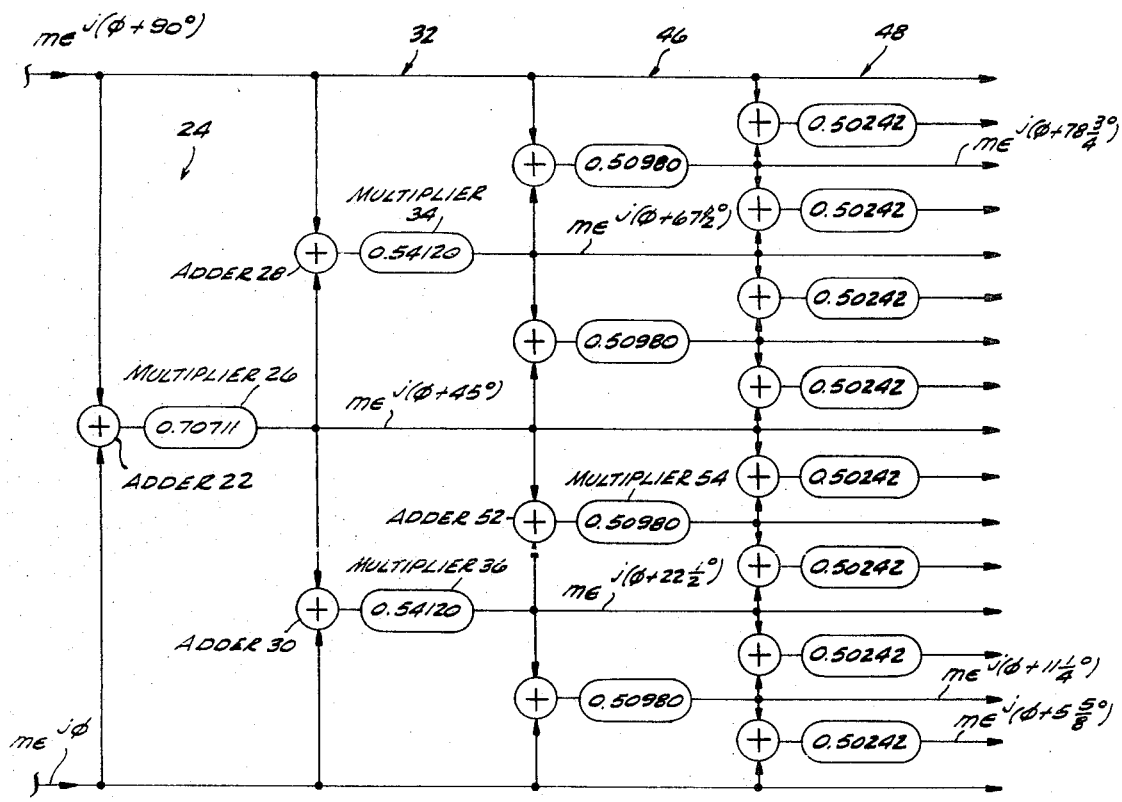
FIG. 6 is a block diagram of a four-stage polyphasor generator having an initial phase angle of 90°.

The above-described polyphase generators provide for output signals each $\Delta$ increment of phase between the angle of the applied signal $me^{j\phi}$ and the angle of the initial phase shifted signal $me^{j(\phi + \theta)}$, such as required in the digital filtering applications mentioned previously. For example, FIG. 6 shows a polyphase generator of four stages with an initial angle of 90° having a plurality of output signals with a $\Delta$ of 5⅝°. Hence, for the embodiment of FIG. 6 output signals are available which are equal in magnitude to the applied signal, at phase increments of 5⅝° over a phase angle interval of 90°.

Figure 7:
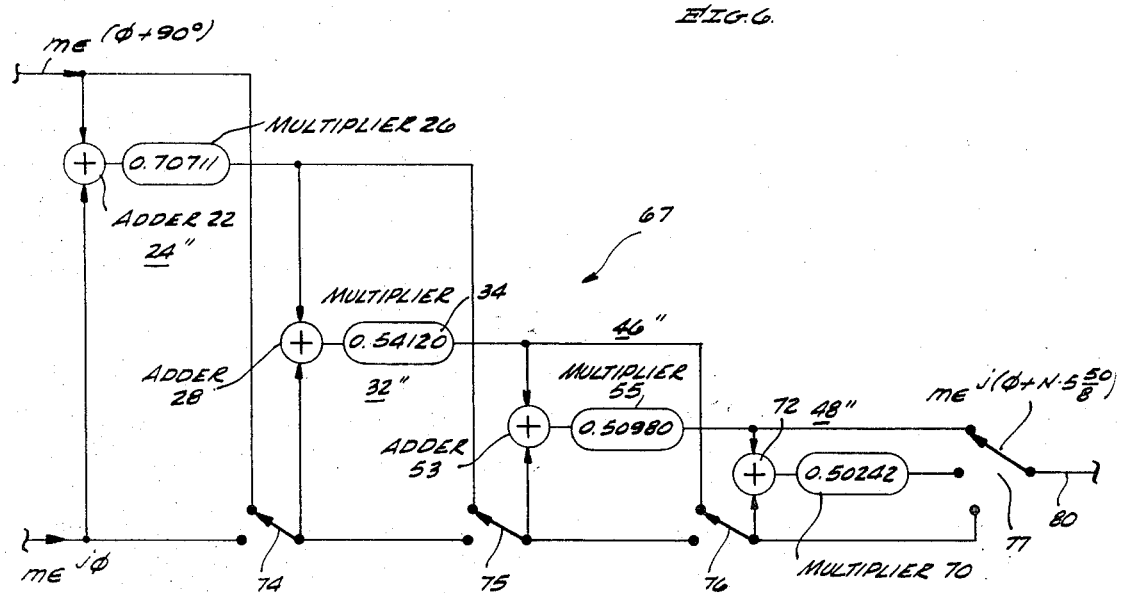
FIG. 7 is a block diagram of a four-stage single output phase rotation device in accordance with the subject invention.

The single output phase rotation device 67 shown in FIG. 7 may be used for applications not requiring a plurality of simultaneous phase shifted output signals. Referring now primarily to FIG. 7, the device 67 comprises a plurality of stages 24'', 32'', 46'', and 48'', which each stage comprising a digital adder and multiplier unit. Stage 24'' comprises input adder 22 followed by multiplier 26; and again it is noted that the adders and multipliers of FIG. 7 are dual channel devices, wherein the inphase and quadrature components of each signal are separately processed.

Also in FIG. 7 one of the input signals to each of the adders of the second, third and fourth stages is selectively coupled to either one of two outputs of the preceding stage by means of switches 74, 75, and 76, respectively. Although these switches are shown as mechanical devices it will be understood that in practice electronic switches are used therefor. Switch 74 allows either the input signal $me^{j\phi}$ or the initially phase shifted input signal $me^{j(\phi + 90°)}$ to be applied as one of the inputs to the second stage adder 28. The other input to the second stage adder 28 is the output of the first stage multiplier 26. Switch 75 allows the selection of either the "switchable input" to second stage adder 28 or the output of the multiplier 26 to be applied as one of the input signals to adder 53 of the third stage. Similarly one of the input signals to adder 72 of the fourth stage is selectable by means of switch 76. Finally, the output signal is selectable by means of switch 77 such that one of the "switchable input" signals to adder 72 may be selected as the output signal; or the output of the adder 72 after amplitude adjustment within multiplier 70 may be applied as the output of device 67. The output of device 67, applied on a lead 80, is equal in magnitude to the applied input signal $me^{j\phi}$ and may have any one of a plurality of phase angles from the group of phase angles defined by the notation $N \cdot 5⅝°$; where N is equal to 0, 1, 2 ... 16. The value of N is determined by the setting of the switches 74 through 77. For example, when all of the switches shown in FIG. 7 are in their lower position the output signal is equal to $me^{j\phi}$; and when the switches 74 through 77 are in the position shown the output signal is equal to $me^{j(\phi + 56 1/4°)}$.

Thus there has been described a new and improved method and apparatus for providing phase rotation of an applied input signal with a reduction in operational time and equipment complexity. It is noted that the several embodiments described herein were selected by way of example to illustrate the principles and operation of the invention, but that in accordance with the invention the configuration of the polyphase generator for any given application is determined by the desired set of output signals therefrom.

What is claimed is:

1. A device for providing phase rotated output signals in response to a pair of input signals of equal magnitudes and differing phase angles applied thereto, said device comprising; a plurality of cascaded processor stages with each stage including means for forming the sum of at least one pair of signals from a group of signals consisting of said input signals and output signals of preceding processor stages, and each stage further including means coupled to said sum forming means for adjusting the magnitude of the sum signals formed therein to provide output signals approximately equal to the magnitude of said input signals.

2. The device of claim 1 wherein said sum forming means of each processor stage subsequent to the first stage includes a plurality of adders and means for applying a different pair of signals from said group of signals to each of said adders, with each said pair of signals applied to adders of a particular stage having a phase angle difference therebetween equal to the incremental phase difference between the output signals of the last preceding processor stage.

3. The device of claim 1 wherein said sum forming means includes at least one adder in each stage and said magnitude adjusting means includes a multiplication unit associated with each adder.

4. The device of claim 3 wherein the multiplier constant of said multiplier units is approximately equal to $1/(2 \cos \theta/2^n)$ where $\theta$ is the phase angle between said pair of input signals and $n$ is the order of the associated processor stage.

5. The device of claim 1 wherein said plurality of processor stages include:
a first processor stage coupled to receive said pair of input signals; and
a plurality of series coupled subsequent processor stages with each stage coupled to receive pairs of signals from a group of signals consisting of said input signals, said first stage output signal, and the output signals of preceding processors stages.

6. The device of claim 1 wherein said sum forming means of each processor stage includes an adder and each processor stage, subsequent to the first stage, includes a switch coupled between the preceding stage and the adder of the associated stage; whereby the signal applied to one input of the associated adder is selectable and the phase angle of the output signal of said device is controlled by the settings of said switches.

7. The device of claim 6 wherein the other input of said associated adders is coupled to the magnitude adjusting means of the preceding processor stage.

8. The device of claim 6 wherein said magnitude adjusting means includes a multiplication unit associated with each adder.

9. The device of claim 8 wherein the multiplier constant of said multiplier units is approximately equal to $1/(2 \cos \theta/2^n)$ where $\theta$ is the phase angle between said pair of input signals and $n$ is the order of the associated processor stage.

10. A device for forming a plurality of phase rotated output signals in response to an applied input signal, said device comprising:
means for phase shifting the applied signal by approximately 120°;
means for adding said applied signal and said 120° phase shifted signal to provide a first output signal;
means for phase shifting the applied signal and said 120° phase shifted signal by plus and minus 90°, respectively, to provide second and third output signals; and
a plurality of cascaded processor stages with each stage comprising means for forming the sum of various pairs of signals from a group of signals consisting of said input signal, said first, second and third output signals and the output signals of preceding processors stages; and each stage further including means coupled to said sum forming means for adjusting the magnitude of the sum signals formed therein to produce an output signal equal to the magnitude of said applied input signal.

11. The device of claim 10 wherein said sum forming means of each processor stage includes a plurality of adders and means for applying a different pair of signals from said group of signals to each of said adders.

12. The device of claim 10 wherein said sum forming means includes a plurality of adders in each stage and said magnitude adjusting means includes a multiplication unit associated with each adder.

13. The device of claim 12 wherein the multiplier constant of the multiplier units is a function of the order of the associated processor stage.

* * * * *